(12) United States Patent
Shen et al.

(10) Patent No.: US 11,675,993 B2
(45) Date of Patent: Jun. 13, 2023

(54) METHOD AND DEVICE FOR RECOGNIZING TWO-DIMENSIONAL BAR CODE

(71) Applicants: GREE ELECTRIC APPLIANCES, INC. OF ZHUHAI, Guangdong (CN); LEAYUN TECHNOLOGY CO., LTD. OF ZHUHAI, Guangdong (CN)

(72) Inventors: Jin Shen, Guangdong (CN); Dechao Song, Guangdong (CN); Jie Tang, Guangdong (CN); Yuan Qiu, Guangdong (CN); Jun Zhang, Guangdong (CN); Yuanji Lu, Guangdong (CN)

(73) Assignees: Gree Electric Appliances, Inc. of Zhuhai, Zhuhai (CN); Leayun Technology Co., Ltd. of Zhuhai, Zhuhai (CN)

( * ) Notice: Subject to any disclaimer, the term of this patent is extended or adjusted under 35 U.S.C. 154(b) by 0 days.

(21) Appl. No.: 17/620,388

(22) PCT Filed: Dec. 24, 2019

(86) PCT No.: PCT/CN2019/127749
§ 371 (c)(1),
(2) Date: Dec. 17, 2021

(87) PCT Pub. No.: WO2020/253186
PCT Pub. Date: Dec. 24, 2020

(65) Prior Publication Data
US 2022/0351013 A1 Nov. 3, 2022

(30) Foreign Application Priority Data
Jun. 17, 2019 (CN) .......................... 201910519931.5

(51) Int. Cl.
*G06K 19/06* (2006.01)
*G06K 7/14* (2006.01)

(52) U.S. Cl.
CPC ...... *G06K 19/06112* (2013.01); *G06K 7/1417* (2013.01); *G06K 19/06037* (2013.01)

(58) Field of Classification Search
CPC ........ G06K 19/06112; G06K 19/06037; G06K 7/1417
See application file for complete search history.

(56) References Cited

U.S. PATENT DOCUMENTS

| 2007/0007349 A1 | 1/2007 | Uchida et al. | |
| 2015/0256391 A1* | 9/2015 | Hardy | H04W 4/50 709/222 |

(Continued)

FOREIGN PATENT DOCUMENTS

| CN | 102087699 A | 6/2011 |
| CN | 104486464 A | 4/2015 |

(Continued)

OTHER PUBLICATIONS

Chen Yulu, Research of location and correction algorithm of QR code based on image processing, A Dissertation Submitted for the Degree of Master, Hefei University of Technology, Hefei, Anhui, P.R. China, Mar. 2016 (67 pages).

(Continued)

*Primary Examiner* — Laura A Gudorf
(74) *Attorney, Agent, or Firm* — McAndrews, Held & Malloy, Ltd.

(57) ABSTRACT

Disclosed are a method and device for recognizing a two-dimensional bar code for improving the efficiency of recognizing the two-dimensional bar code. The method comprises: a relative position of a household appliance and a terminal device is determined during network configuration (Continued)

of the household appliance; a display parameter for displaying the two-dimensional bar code is determined according to the relative position, wherein the display parameter comprises a size of the two-dimensional bar code to be displayed and the two-dimensional bar code carries device information of the household appliance; the display parameter is sent to the household appliance to enable the household appliance to display a two-dimensional bar code picture according to the display parameter; and the two-dimensional bar code picture is recognized to obtain the device information of the household appliance.

12 Claims, 4 Drawing Sheets

(56) References Cited

U.S. PATENT DOCUMENTS

| | | | |
|---|---|---|---|
| 2017/0026834 A1 | 1/2017 | Nakajima | |
| 2017/0041566 A1* | 2/2017 | He | H04N 13/398 |
| 2018/0308248 A1* | 10/2018 | Hubert | G06V 10/245 |

FOREIGN PATENT DOCUMENTS

| | | |
|---|---|---|
| CN | 105138939 A | 12/2015 |
| CN | 105138942 A | 12/2015 |
| CN | 105791438 A | 7/2016 |
| CN | 106056027 A | 10/2016 |
| CN | 106304327 A | 1/2017 |
| CN | 106384065 A | 2/2017 |
| CN | 108370492 A | 8/2018 |
| CN | 207778706 U | 8/2018 |
| CN | 108732560 A | 11/2018 |
| CN | 208141384 U | 11/2018 |
| CN | 109214810 A | 1/2019 |
| CN | 109598162 A | 4/2019 |
| CN | 109711226 A | 5/2019 |
| CN | 110287744 A | 9/2019 |
| JP | 2008269550 A | 11/2008 |

OTHER PUBLICATIONS

Chinese search report dated Jun. 17, 2019 in Chinese application No. 2019105199315 (4 pages).

International Search Report, dated Mar. 24, 2020, in International application No. PCT/CN2019/127749, filed on Dec. 24, 2019 (4 pages).

* cited by examiner

METHOD AND DEVICE FOR RECOGNIZING TWO-DIMENSIONAL BAR CODE

CROSS-REFERENCE TO RELATED APPLICATION

The disclosure is a 37 of International Patent Application No. PCT/CN2019/127749, filed Dec. 24, 2019, which claims benefit of Chinese Patent Application No. 201910519931.5, filed on Jun. 17, 2019 and entitled "Method and Device for Recognizing two-dimensional Bar Code", the disclosure of which is hereby incorporated by reference in its entirety.

TECHNICAL FIELD

The disclosure relates to the electronic technical field, in particular to a method and device for recognizing a two-dimensional bar code.

BACKGROUND

A user usually scans a two-dimensional bar code of a household appliance by a terminal device to achieve network configuration of the household appliance.

At present, the two-dimensional bar code of the household appliance is usually fixedly arranged on the household appliance. When the user scans the two-dimensional bar code by the terminal device, the user needs to find the two-dimensional bar code on the household appliance and then turn on the terminal device to scan the two-dimensional bar code. When the distance between the terminal device and the household appliance is too large, the terminal device may hardly recognize the two-dimensional bar code, and at the moment, the user needs to adjust the distance between the terminal device and the household appliance. When the distance between the terminal device and the household appliance is too small, a camera of the terminal device is unable to collect the whole two-dimensional bar code, and at the moment, the user also needs to adjust the distance between the terminal device and the household appliance. It can be seen in the related art that in a process of scanning the two-dimensional bar code, as it is needed to adjust the distance between the terminal device and the household appliance repeatedly, the efficiency of recognizing the two-dimensional bar code is relatively low.

SUMMARY

The disclosure provides a method and device for recognizing a two-dimensional bar code, which is used for improving the efficiency of recognizing the two-dimensional bar code.

A method for recognizing a two-dimensional bar code applied to a terminal device, the method includes:

a relative position of the household appliance and the terminal device is determined during network configuration of the household appliance;

a display parameter for displaying the two-dimensional bar code is determined according to the relative position, wherein the display parameter comprises a size of the two-dimensional bar code to be displayed and the two-dimensional bar code carries device information of the household appliance;

the display parameter is sent to the household appliance to enable the household appliance to display a two-dimensional bar code picture according to the display parameter; and the two-dimensional bar code picture is recognized to obtain the device information of the household appliance.

In the embodiment of the disclosure, the terminal device determines according to the relative position of the terminal device and the household appliance, the display parameter of the two-dimensional bar code currently to be displayed. The household appliance displays a corresponding two-dimensional bar code picture according to the display parameter. As the display parameter is determined according to the relative position by the terminal device, the two-dimensional bar code to be displayed is not too large or too small. The terminal device can recognize the two-dimensional bar code quickly, such that the efficiency of recognizing the two-dimensional bar code is improved. Further, as it is not needed to adjust, by a user, the distance between the terminal device and the household appliance repeatedly, the efficiency of recognizing the two-dimensional bar code can be further improved, and the usage experience of the user can be improved.

In a possible embodiment, determining the relative position of the household appliance and the terminal device includes:

a radio signal broadcasted by the household appliance is received and a signal intensity of the radio signal is determined; and the relative position of the household appliance and the terminal device is determined according to the signal intensity.

In the embodiment of the disclosure, a way of determining the relative position is provided. The terminal device determines the relative position of the household appliance and the terminal device according to the signal intensity of the received radio signal broadcasted by the household appliance. As the household appliance can transmit the radio signal in real time, the timeliness of the relative position determined by the terminal device is guaranteed and reference value of the relative position is improved, such that the display parameter determined according to the relative position can better meet a requirement of recognizing the two-dimensional bar code currently by the terminal device.

In a possible embodiment, the relative position include a distance between the household appliance and the terminal device and a relative angle between the household appliance and the terminal device, and the display parameter further includes an angle between the two-dimensional bar code to be displayed on the household appliance and the terminal device; determining the display parameter for displaying the two-dimensional bar code according to the relative position includes:

an angle between the two-dimensional bar code to be displayed on the household appliance and the terminal device is determined according to the relative angle between the household appliance and the terminal device; and a size of the displayed two-dimensional bar code is determined according to the distance between the household appliance and the terminal device and a first corresponding relationship, wherein the first corresponding relationship comprises corresponding relationships between different distances between the terminal device and the household appliance and the sizes of different two-dimensional bar codes.

In the embodiment of the disclosure, the display parameter determined by the terminal device not only includes the size of the two-dimensional bar code, but also includes the angle between the two-dimensional bar code to be displayed on the household appliance and the terminal device, such that the size of the two-dimensional bar code picture to be displayed and the angle between the two-dimensional bar code to be displayed on the household appliance and the terminal device are guaranteed to meet the requirement of recognition by the terminal device. Thus, the success rate of recognizing the two-dimensional bar code by the terminal device at one time is improved and the efficiency of recognizing the two-dimensional bar code can further be improved relatively.

In a possible embodiment, recognizing the two-dimensional bar code picture to obtain the device information of the household appliance includes:

an operation for adjusting the displayed two-dimensional bar code is detected when the device information of the household appliance is not obtained according to the two-dimensional bar code picture;

the display parameter is adjusted according to the operation to obtain the adjusted display parameter;

the household appliance is controlled according to the adjusted display parameter to display the adjusted two-dimensional bar code picture; and the adjusted two-dimensional bar code picture is recognized to obtain the device information of the household appliance.

In the embodiment of the disclosure, when the terminal device recognizes the two-dimensional bar code picture, the user can further adjust the display parameter continuously in real time, such that the success rate of recognizing the two-dimensional bar code by the terminal device is improved and the efficiency of recognizing the two-dimensional bar code can further be improved relatively.

In a possible embodiment, before recognizing the two-dimensional bar code picture to obtain the device information of the household appliance, the method includes:

a focusing parameter of a camera in the terminal device is adjusted according to the relative position to enable the camera in the terminal device to be focused to the area of the two-dimensional bar code picture.

In the embodiment of the disclosure, the terminal device can be automatically focused to the area where the two-dimensional bar code picture displayed by the household appliance, such that the success rate of recognizing the two-dimensional bar code is improved.

A method for recognizing a two-dimensional bar code applied to a household appliance, the method including:

a display parameter sent by a terminal device is received during network configuration of the household appliance, wherein the display parameter is determined by the terminal device according to a relative position of the terminal device and the household appliance and the display parameter includes a size of the two-dimensional bar code to be displayed; and the two-dimensional bar code picture is displayed according to the display parameter to enable the terminal device to obtain device information of the household appliance according to the two-dimensional bar code picture.

A method for recognizing a two-dimensional bar code applied to a household appliance, the method including:

a relative position of the household appliance and the terminal device is determined during network configuration of the household appliance;

a display parameter for displaying the two-dimensional bar code is determined according to the relative position, wherein the display parameter comprises a size of the two-dimensional bar code to be displayed and the two-dimensional bar code carries device information of the household appliance;

the two-dimensional bar code picture is displayed according to the display parameter to enable the terminal device to obtain the device information of the household appliance according to the two-dimensional bar code picture.

A device for recognizing a two-dimensional bar code, including:

a processing module configured to determine a relative position of the household appliance and the terminal device during network configuration of the household appliance and determine according to the relative position, a display parameter for displaying the two-dimensional bar code, wherein the display parameter includes a size of the two-dimensional bar code to be displayed and the two-dimensional bar code carries device information of the household appliance; and a transceiving module configured to send the display parameter to the household appliance to enable the household appliance to display a two-dimensional bar code picture according to the display parameter; and the processing module further configured to recognize the two-dimensional bar code picture to obtain the device information of the household appliance.

In a possible embodiment, the transceiving module is further configured to receive a radio signal broadcasted by the household appliance and determine a signal intensity of the radio signal; and the processing module is configured to determine the relative position of the household appliance and the terminal device according to the signal intensity.

In a possible embodiment, the relative position includes a distance between the household appliance and the terminal device and a relative angle between the household appliance and the terminal device;

the processing module is configured to determine the angle between the two-dimensional bar code displayed on the household appliance and the terminal device according to the relative angle between the household appliance and the terminal device; and the processing module is configured to determine a size of the two-dimensional bar code to be displayed according to the distance between the household appliance and the terminal device and a first corresponding relationship, wherein the first corresponding relationship comprises corresponding relationships between different distances between the terminal device and the household appliance and the sizes of different two-dimensional bar codes.

In a possible embodiment, the processing module is configured to:

detect an operation for adjusting the displayed two-dimensional bar code when the device information of the household appliance is not obtained according to the two-dimensional bar code picture;

adjust the display parameter according to the operation to obtain the adjusted display parameter;

control the household appliance to display the adjusted two-dimensional bar code picture according to the adjusted display parameter; and recognize the adjusted two-dimensional bar code picture to obtain the device information of the household appliance.

In a possible embodiment, the processing module is configured to:

adjust a focusing parameter of a camera in the terminal device according to the relative position to enable the camera in the terminal device to be focused to the area of the two-dimensional bar code picture before recognizing the two-dimensional bar code picture to obtain the device information of the household appliance.

A device for recognizing a two-dimensional bar code, including:

a transceiving module configured to receive a display parameter sent by a terminal device during network configuration of the household appliance, wherein the display parameter is determined by the terminal device according to a relative position of the terminal device and the household appliance and the display parameter includes a size of the two-dimensional bar code to be displayed; and a processing module configured to display the two-dimensional bar code picture according to the display parameter to enable the terminal device to obtain device information of the household appliance according to the two-dimensional bar code picture.

A device for recognizing a two-dimensional bar code, including:

a determining module configured to determine a relative position of the household appliance and the terminal device during network configuration of the household appliance and determine a display parameter for displaying the two-dimensional bar code according to the relative position, the display parameter includes a size of the two-dimensional bar code to be displayed and the two-dimensional bar code carries device information of the household appliance; and a display module configured to display the two-dimensional bar code picture according to the display parameter to enable the terminal device to obtain the device information of the household appliance according to the two-dimensional bar code picture.

In a possible embodiment, the device further includes a transceiving module, wherein the transceiving module is configured to broadcast a radio signal and receive an intensity of the radio signal fed back by the terminal device; and the determining module is configured to determine the relative position of the household appliance and the terminal device according to the intensity of the radio signal.

In a possible embodiment, the relative position include a distance between the household appliance and the terminal device and a relative angle between the household appliance and the terminal device, and the display parameter further includes an angle between the two-dimensional bar code to be displayed on the household appliance and the terminal device; the determining module is configured to:

determine the angle between the two-dimensional bar code to be displayed on the household appliance and the terminal device according to the relative angle between the household appliance and the terminal device; and determine the size of the two-dimensional bar code to be displayed according to the distance between the household appliance and the terminal device and a first corresponding relationship, wherein the first corresponding relationship comprises corresponding relationships between different distances between the terminal device and the household appliance and the sizes of different two-dimensional bar codes.

In a possible embodiment, the transceiving module is further configured to receive a adjusted display parameter sent by the terminal device, wherein the adjusted display parameter is generated, by the terminal device, according to an operation for adjusting the displayed two-dimensional bar code when the device information of the household appliance is not obtained according to the two-dimensional bar code picture does; and The display module is further configured to display the adjusted two-dimensional bar code according to the adjusted display parameter.

A device for recognizing a two-dimensional bar code, including:

at least one processor; and a memory in communication connection with the at least one processor, wherein the memory stores an instruction capable of being executed by the at least one processor, and the at least one processor realizes the method in the first aspect and in any one possible embodiment by executing the instruction stored by the memory.

A computer readable storage medium, wherein the computer readable storage medium stores a computer instruction, and when the computer instruction runs on a computer executes the method in the first aspect and in any one possible embodiment.

DETAILED DESCRIPTION OF THE EMBODIMENTS

In order to better understand the technical scheme provided by the embodiment of the disclosure, detailed description will be made below in combination with drawings of description and specific embodiments.

In order to improve the efficiency of recognizing the two-dimensional bar code, the embodiment of the disclosure provides a method for recognizing a two-dimensional bar code. Description on application scenarios suitable for the method is made below.

Figure 1:
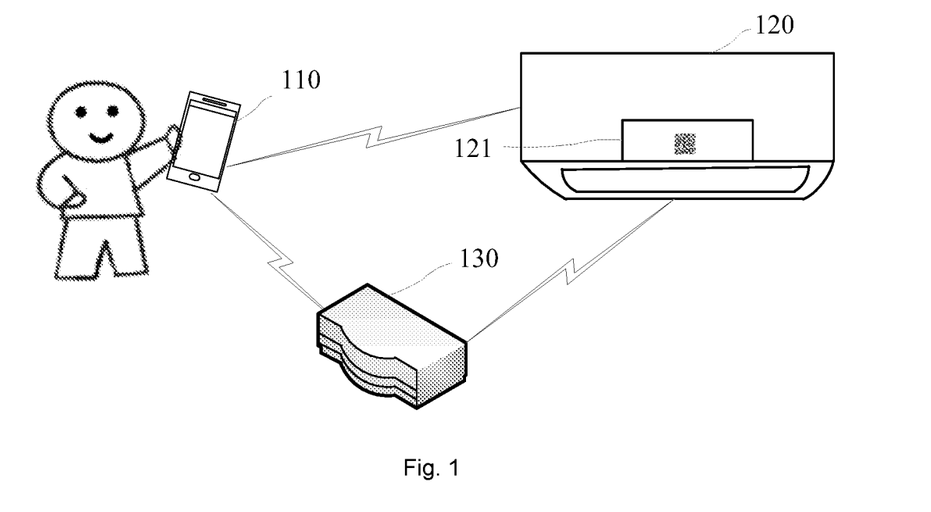
FIG. 1 is a scene schematic diagram of recognizing the two-dimensional bar code provided by the embodiment of the disclosure.

Referring to FIG. 1, the application scenarios include a terminal device 110, a home appliance 120 and a network device 130. The terminal device 110 corresponds to a user, which may be understood correspondingly that the user may control the terminal device 110 to achieve control of the home appliance 120. The terminal device 110 may further be provided with a corresponding software module and the user may achieve control of the home appliance 120 via the software module in the terminal device 110. The terminal device 110 may be, for example, a mobile phone, a personal computer or a tablet personal computer and the like. The household appliance 120 refers to a household appliance 120 with radio signal transceiving and displaying functions in general, and includes, but not limited to, a camera, an air conditioning device, a washing machine and the like. In FIG.

1, the air conditioning device is taken as an example. The home appliance 120 includes a display component 121. The network device 130 may be, for example, a router or an optical modem and the like.

In an example embodiment, the terminal device 110 is configured to assist network configuration of the household appliance 120 and the terminal device 110 may establish a local area network communication with the household appliance 120 first before the network configuration of the household appliance 120. The terminal device 110 determines the relative position with the household appliance 120 via the local area network communication and then determines the size of the two-dimensional bar code picture needed to be displayed by the household appliance 120 according to the relative position and controls the display component 121 of the household appliance 120 to display the two-dimensional bar code picture with a corresponding size. The terminal device 110 recognizes the two-dimensional bar code picture, and after recognizing the two-dimensional bar code picture successfully, the terminal device 110 assists the household appliance 120 to be accessed to the network device 130 to complete a network configuration process of the household appliance 120.

Or, after the terminal device 110 and the household appliance 120 establish the local area network communication, the household appliance 120 determines the relative position with the terminal device 110 directly, and then the household appliance 120 displays the two-dimensional bar code picture with the corresponding size according to the relative position. After recognizing the two-dimensional bar code picture, the terminal device 110 assists the household appliance 120 to be accessed to the network device 130 so as to complete the network configuration process of the household appliance 120.

It should be noted that after the terminal device 110 and the household appliance 120 establish the local area network communication, the terminal device 110 and the household appliance 120 may communicate with each other. However, as the coverage of local area network communication is smaller, it is usually needed to access the household appliance 120 to a network with a relatively large coverage by means of the terminal device 110.

Description on the method for recognizing the two-dimensional bar code in the embodiment of the disclosure is made below based on the application scenario of FIG. 1.

Figure 2:
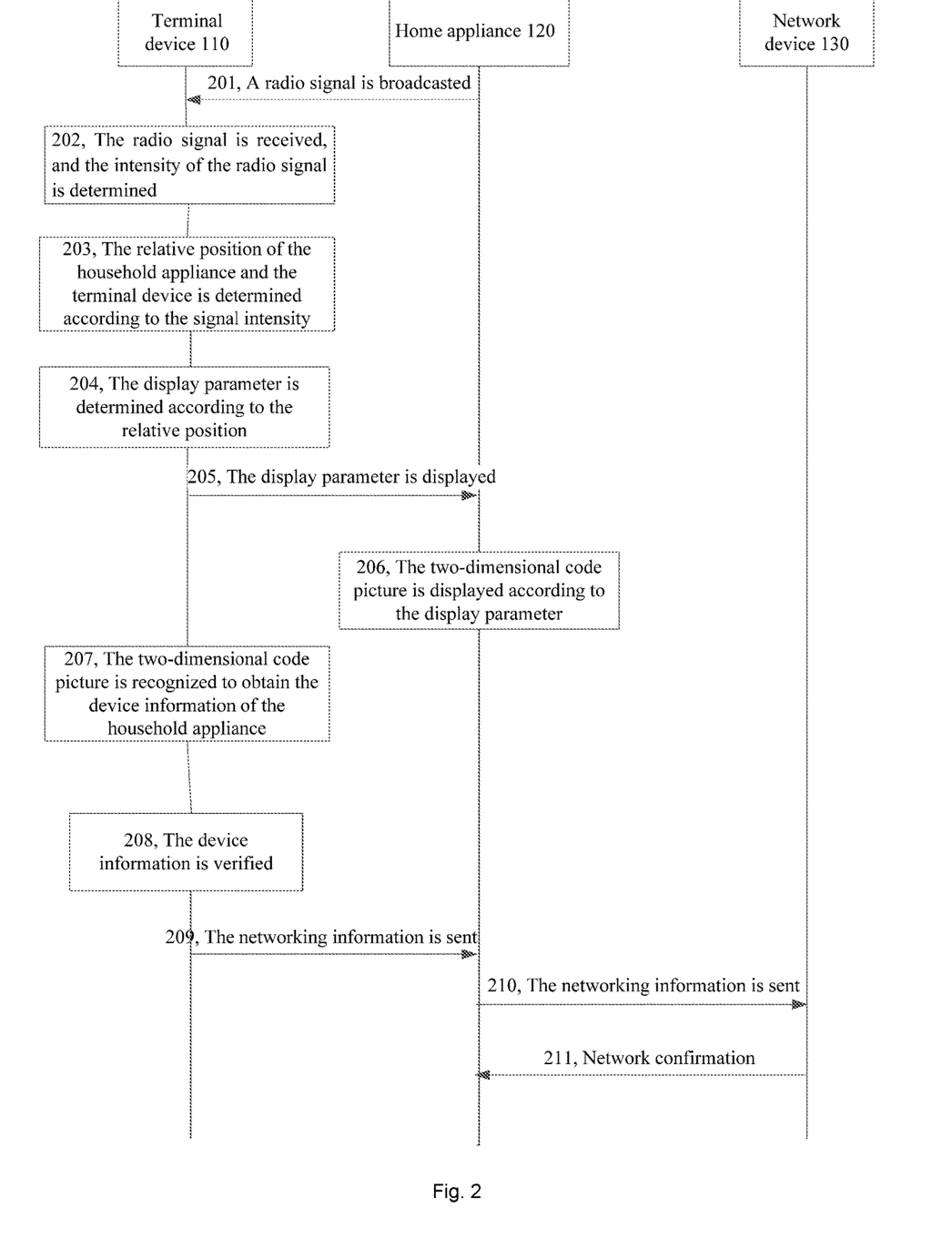
FIG. 2 is a flow diagram of a method for recognizing the two-dimensional bar code provided by the embodiment of the disclosure.

When the user wants to perform network configuration for the household appliance 120, the user turns on the household appliance 120, and after the household appliance 120 is powered on, the household appliance 120 executes S201, i.e., broadcasting the radio signal.

In an example embodiment, the household appliance 120 may be provided with a radio signal transmitting module, for example, a Wireless Fidelity (WIFI) transceiving module. The household appliance 120 transmits the radio signal via the radio signal transceiving module. The household appliance 120 may transmit either the radio signal with a fixed emission intensity or radio signals with different intensities according to actual conditions, and the transmitted radio signal carries the emission intensity of the radio signal.

S202, the terminal device 110 receives the radio signal and determines the intensity of the radio signal.

In an example embodiment, when the user configures the network for the household appliance 120, the terminal device 110 is relatively close to the household appliance 120 generally. Thus, the terminal device 110 may detect and receive the radio signal transmitted by the household appliance 120 and determine the intensity of the received radio signal. When the radio signal carries the emission intensity, the terminal device 110 can further obtain the emission intensity of the household appliance 120 according to the radio signal.

S203, the terminal device 110 determines the relative position of the household appliance 120 and the terminal device 110 according to the signal intensity.

In an example embodiment, the relative position includes the distance between the household appliance 120 and the terminal device 110 and may further include the relative angle between the household appliance 120 and the terminal device 110. As the radio signal will be attenuated continuously along with increase of a propagation distance, generally speaking, the greater the propagation distance is, the smaller the intensity of the received radio signal. Therefore, the terminal device 110 may determine the distance between the household appliance 120 and the terminal device 110 according to the emission intensity of the household appliance 120 and the intensity of the received radio signal after determining the intensity of the received radio signal. The terminal device 110 may determine a direction of the radio signal while detecting and receiving the radio signal so as to determine the relative angle between the household appliance 120 and the terminal device 110.

The way of the above-mentioned S201-S203 is merely an example of determining the relative position of the terminal device 110 and the household appliance 120, and there may be the following ways of determining the relative position of the terminal device 110 and the household appliance 120.

The terminal device 110 may determines the distance to the household appliance 120 via a distance sensor. The terminal device 110 may obtain the relative angle between the terminal device 110 and the household appliance 120 via the relative angle sent by the household appliance 120.

In an example embodiment, the household appliance 120 determines the relative angle between the household appliance 120 and the terminal device 110 by detecting a position of the user by an infrared sensor and sends the relative angle to the terminal device 110 which obtains the relative angle.

The terminal device 110 executes the step S204 after determining the relative position of the household appliance 120 and the terminal device 110, i.e., determining the display parameter according to the relative position.

The relative position include different contents, and the content of the display parameter determined correspondingly and the way of determining the display parameter will be different, too, which is described below with examples.

The terminal device 110 determines the size of the two-dimensional bar code to be displayed according to the distance between the terminal device 110 and the household appliance 120 and the first corresponding relationship.

In an example embodiment, the relative position includes the relative distance between the household appliance 120 and the terminal device 110. The terminal device 110 pre-stores the first corresponding relationship, i.e., the corresponding relationships between different distances and different sizes of two-dimensional bar codes, or the terminal device 110 may obtain the first corresponding relationship from other devices. The terminal device 110 determines the size of the two-dimensional bar code to be displayed corresponding to the distance according to the first corresponding relationship after determining the distance between the terminal device 110 and the household appliance 120.

The display parameter in the embodiment of the disclosure is the size of the two-dimensional bar code to be displayed.

For example, a first corresponding relationship is as shown in Table 1.

TABLE 1

| Distance | Size of the two-dimensional bar code 9 to be displayed (pixel) |
|---|---|
| 0-5 m (including 5 m) | 300*300 |
| 5-10 m (including 10 m) | 500*500 |
| 10-20 (including 20 m) | 1000*1000 |

When it is determined that the distance between the terminal device 110 and the household appliance 120 is 5 m, the size of the two-dimensional bar code to be displayed by the household appliance 120 is 300*300.

The terminal device 110 determines the size of the two-dimensional bar code to be displayed according to the distance between the terminal device 110 and the household appliance 120 and the first corresponding relationship;

the terminal device 110 determines the relative angle between the two-dimensional bar code to be displayed on the household appliance 120 and the terminal device according to the relative angle between the terminal device 110 and the household appliance 120.

In an example embodiment, besides the size of the two-dimensional bar code to be displayed which will affect the success rate of recognizing the two-dimensional bar code by the terminal device 110, the relative angle between the displayed two-dimensional bar code and the terminal device 110 will affect the success rate of recognizing the two-dimensional bar code by the terminal device 110, too. Therefore, in the embodiment of the disclosure, in order to improve the success rate of recognizing the two-dimensional bar code by the terminal device 110, besides determining the size of the displayed two-dimensional bar code, it is further needed to determine the relative angle between the displayed two-dimensional bar code and the terminal device 110.

Determining the size of the displayed two-dimensional bar code may refer to the content in the first way, which is not described repeatedly. In order to guarantee the success rate of recognizing the two-dimensional bar code by the terminal device 110, the displayed two-dimensional bar code and the terminal device 110 are in a direct facing direction. When the relative angle between the household appliance 120 and the terminal device 110 is determined, i.e., a relative inclination angle between the household appliance 120 and the terminal device 110 is determined, the relative angle between the two-dimensional bar code to be displayed and the terminal device 110 is adjusted, such that the two-dimensional bar code to be displayed and the terminal device 110 are in a direct facing direction so as to obtain the relative angle between the displayed two-dimensional bar code and the terminal device 110.

In the embodiment of the disclosure, the display parameter includes the size of the two-dimensional bar code and the relative angle between the two-dimensional bar code to be displayed on the household appliance 120 and the terminal device 110.

In a possible embodiment, under a condition that the display parameter includes the relative angle between the household appliance 120 and the terminal device 110, when the household appliance 120 displays the two-dimensional bar code picture, the household appliance 120 adjusts the angle between the displayed two-dimensional bar code picture and the terminal device 110 according to the relative angle between the household appliance 120 and the terminal device 110. The way of adjusting the angle between the two-dimensional bar code picture to be displayed and the terminal device 110 is described below in an example by the household appliance 120.

The display component 121 in the household appliance 120 may rotate, for example, the household appliance 120 is provided with a rotating component, the display component 120 is arranged on the rotating component, the household appliance 120 controls the rotating component to rotate, and the rotating component drives the display component 121 to rotate so as to adjust the angle between the displayed two-dimensional bar code picture and the terminal device 110.

For example, after determining that the relative angle between the terminal device 110 and the household appliance 120 is 30 degrees east to west, the terminal device 110 determines that the relative angle between the two-dimensional bar code to be displayed and the terminal device 110 is 30 degrees west to east. A default position of the display component 121 in the household appliance 120 is a front surface of the household appliance 120, i.e., a surface opposite to the terminal device 110. After the household appliance 120 receives the display parameter, the display component 121 is rotated at 30 degrees west to east, thereby adjusting the relative angle between the displayed two-dimensional bar code picture and the terminal device 110.

In the adjusting way, it is merely needed to rotate the display component 121, such that a driving force which drives rotation can be saved relatively. Further, the adjustable angle range is relatively large.

The household appliance 120 stores two-dimensional bar code pictures at different angles, and after determining the relative angle between the two-dimensional bar code to be displayed and the terminal device 110, the household appliance 120 displays the two-dimensional bar code picture at a corresponding angle.

In the adjusting way, it is not needed to modify the household appliance 120 in mechanical structure, such that the cost is saved.

S205, the terminal device 110 sends the display parameter to the household appliance 120.

In an example embodiment, after determining the display parameter, the terminal device 110 sends the display parameter to the household appliance 120.

S206, the household appliance 120 displays the two-dimensional bar code picture according to the display parameter.

In an example embodiment, the household appliance 120 may pre-store the two-dimensional bar code pictures, and the two-dimensional bar code pictures carry the device information of the household appliance 120. After receiving the display parameter, the household appliance executes the step S206, i.e., displaying the two-dimensional bar code picture according to the display parameter. Or, after receiving the display parameter, the household appliance 120 may require the device information from a background server, and after receiving the device information fed back, the household appliance 120 may generate and display the two-dimensional bar code picture according to the device information. The device information includes a device identifier, a device address and the like, and the device address may be, for example, a Medium Access Control (MAC) address of a device address household appliance 120 and the like.

In an example embodiment, the household appliance 120 adjusts the display parameter of the pre-stored two-dimensional bar code picture to the received display parameter and displays the two-dimensional bar code picture on the display component 121. The way of adjusting the relative angle between the displayed two-dimensional bar code picture and the terminal device 110 by the household appliance 120 may refer to the content described above, which is not described repeatedly herein.

In a possible embodiment, in the process of recognizing the two-dimensional bar code picture by the terminal device 110, the user may finely adjust and move the position of the terminal device 110, which may be understood that the user changes the relative position of the terminal device 110 and the household appliance 120. However, the change degree of the relative position is relatively small, change degree of the relative position is smaller, for example, the relative angle between the terminal device 110 and the household appliance 120 changes in a preset angle range and the distance between the terminal device 110 and the household appliance 120 changes in a preset distance range. The change may not be determined by the terminal device 110 via the radio signal sent by the household appliance 120. Under a condition of fine adjustment, a condition that the terminal device 110 cannot recognize the two-dimensional bar code picture successfully may occur, that is to say, the terminal device 110 may not obtain the device information of the household appliance 120 via the two-dimensional bar code picture. Under the condition, the user may adjust the operation of displaying the two-dimensional bar code manually, for example, the terminal device 110 is provided with a zoom-in control or a zoom-out control. The user clicks the zoom-in control or clicks the zoom-out control. After detecting the operation, the terminal device 110, responding to the operation, adjusts the display parameter to obtain the adjusted display parameter. The terminal device 110 sends the adjusted display parameter to the household appliance 120 according to the adjusted display parameter, the household appliance 120 displays the adjusted two-dimensional bar code picture after obtaining the adjusted display parameter, and the terminal device 110 obtains the device information of the household appliance after recognizing the adjusted two-dimensional bar code picture again.

In a possible embodiment, the household appliance 120 may receive the display parameters sent by a plurality of terminal devices 110 and the household appliance 120 may display the two-dimensional bar code pictures corresponding to the display parameters according to a sequential order of the received display parameters.

S207, the terminal device 110 recognizes the two-dimensional bar code picture to obtain the device information of the household appliance 120.

In an example embodiment, after the household appliance 120 displays the two-dimensional bar code pictures according to the display parameters, the terminal device 110 may recognize the two-dimensional bar code pictures via the camera and obtain the device information of the household appliance 120 carried in the two-dimensional bar code pictures after recognizing the two-dimensional bar code pictures.

In a possible embodiment, before recognizing the two-dimensional bar code picture, the terminal device 110 further adjusts a focusing parameter of the camera in the terminal device 110 according to the relative position, such that the camera in the terminal device 110 is focused to the area of the two-dimensional bar code picture, and thus, the success rate of recognizing the two-dimensional bar code by the terminal device 110 is improved.

S208, the terminal device 110 verifies the device information.

In an example embodiment, after obtaining the device information of the household appliance 120, the terminal device 110 verifies the device information. When the terminal device 110 determines that the identity of the household appliance 120 is illegal, the household appliance 120 is declined to network. When the terminal device 110 determines that the identity of the household appliance 120 is legal, the S209 is executed, i.e., networking information is sent to the household appliance 120.

In an example embodiment, the terminal device 110 determines that the identity of the household appliance 120 is legal, and the networking information may be sent to the household appliance 120, such that it is convenient to obtain the networking information by the household appliance 120. The networking information includes an address, a network password and the like of the network device.

S210, the terminal device 120 sends the networking information to the network device 130.

In an example embodiment, after obtaining the networking information, the household appliance 120 sends the networking information to the network device 130.

S211, the networking device sends a networking confirmation to the household appliance 120.

In an example embodiment, after obtaining the networking information, the networking device 130 verifies the network password and the like in the networking information and after verifying the networking information, the networking device 130 confirms feedback to the household appliance 120 to inform that the household appliance 120 has been accessed to network successfully.

S209-S211 are merely examples of a way of assisting the household appliance 120 to network by the terminal device 110. In a possible embodiment, after determining that the identity of the household appliance 120 is legal, the terminal device 110 can further forward the device information of the household appliance 120 to the network device 130. After verifying that the identity of the household appliance 120 is legal, the network device 130 feeds the networking conformation to the household appliance 120.

In order to improve the efficiency of recognizing the two-dimensional bar code, another method for recognizing the two-dimensional bar code provided by the embodiment of the disclosure is introduced below based on the application scenario described in FIG. 1.

Figure 3:
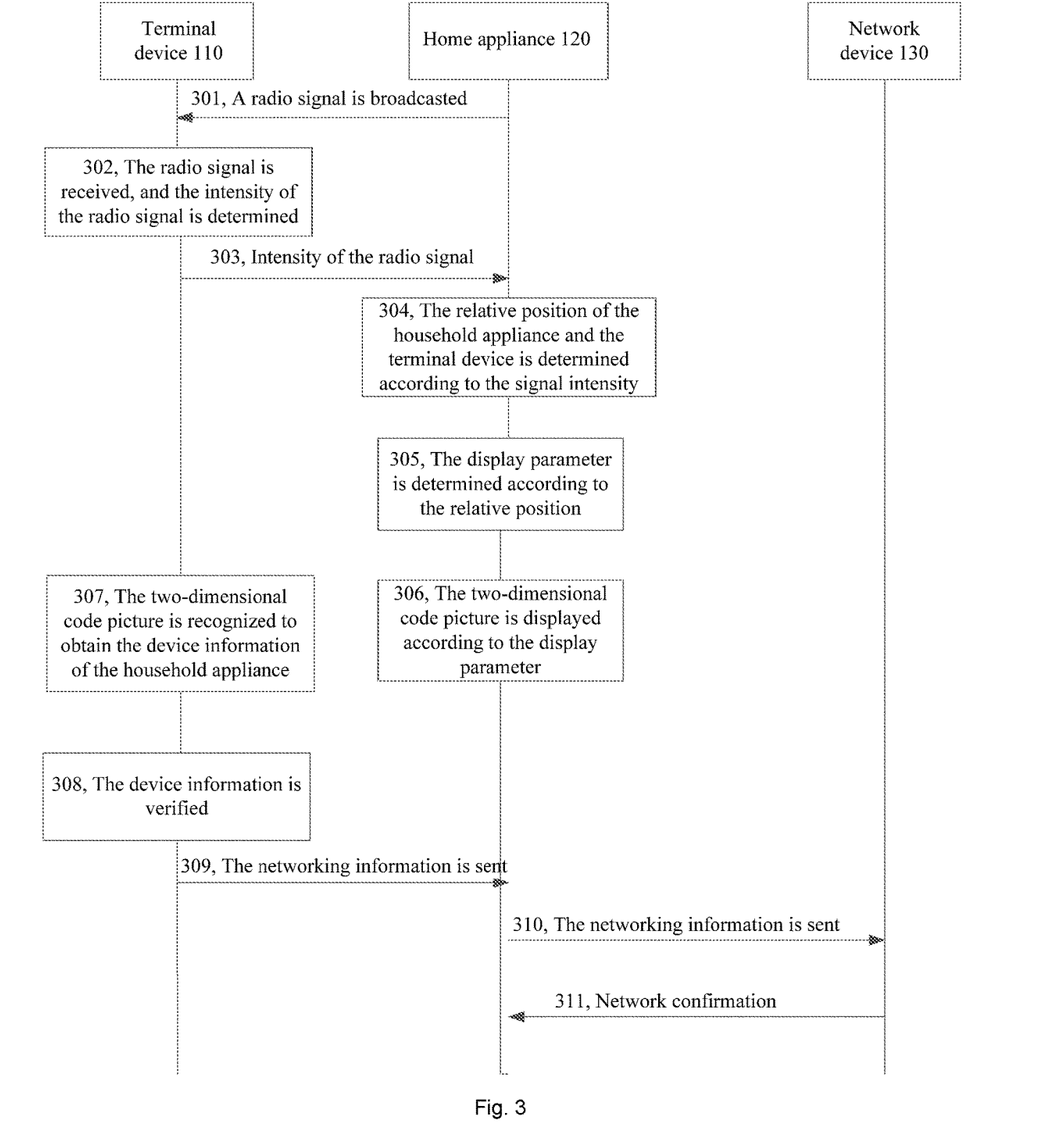
FIG. 3 is a flow diagram of a method for recognizing the two-dimensional bar code provided by the embodiment of the disclosure.

Referring to FIG. 3, after the household appliance 120 is powered on, the step S301 is executed to broadcast the radio signal.

In an example embodiment, the radio signal and the way of broadcasting the radio signal may refer to the content described in the S201, which is not described repeatedly herein.

S302, the terminal device 110 receives the radio signal and determines the intensity of the radio signal.

In an example embodiment, the content of the S302 may refer to the content described in the S202, which is not described repeatedly herein.

S303, the terminal device 110 sends the intensity of the radio signal to the household appliance 120.

In an example embodiment, after determining the intensity of the received radio signal, the terminal device 110 sends the intensity of the radio signal to the household appliance 120.

S304, the household appliance 120 determines the relative position between the household appliance 120 and the terminal device 110 according to the signal intensity.

In an example embodiment, the content of determining the relative position between the household appliance 120 and the terminal device 110 by the household appliance 120 can refer to the content described above, which is not described repeatedly herein. Different from the previous embodiment, the relative position is determined by the household appliance 120 in the embodiment of the disclosure.

S305, the household appliance 120 determines the display parameter according to the relative position.

In an example embodiment, the relative position, the display parameters and the content of determining the display parameters according to the relative position may refer to the content described in the S204 which is not described repeatedly herein. Different from the previous embodiment, the relative position is determined by the household appliance 120 in the embodiment of the disclosure.

S306, the household appliance 120 displays the two-dimensional bar code picture according to the display parameters.

In an example embodiment, the household appliance 120 displays the two-dimensional bar code pictures according to the display parameters after determining the display parameters. The content of the displayed two-dimensional bar codes may refer to the content described in the S206, which is not described repeatedly herein.

S307, the terminal device 110 recognizes the two-dimensional bar code picture to obtain the device information of the household appliance 120.

In an example embodiment, the way of recognizing the two-dimensional bar code picture by the terminal device 110 and the device information may refer to the content described in the S207, which is not described repeatedly herein.

S308, the terminal device 110 verifies the device information.

In an example embodiment, the content of verifying the device information may refer to the content described in the S208, which is not described repeatedly herein.

S309, the terminal device 110 sends the networking information to the household appliance 120.

S310, the household appliance 120 sends the networking information to the network device 130.

S311, the network device 130 sends the networking confirmation to the household appliance 120.

Figure 4:
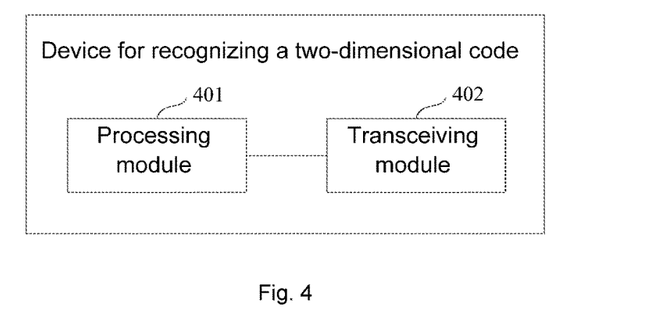
FIG. 4 is a first structural diagram of a device for recognizing the two-dimensional bar code provided by the embodiment of the disclosure.

Based on the method for recognizing the two-dimensional bar code described in FIG. 2, the embodiment of the disclosure provides a device for recognizing the two-dimensional bar code. The device is arranged in the terminal device 110 described in FIG. 2. Referring to FIG. 4, the device includes a processing module 401 and a transceiving module 402, wherein a processing module 401 configured to determine a relative position of the household appliance 120 and the terminal device 110 during network configuration of the household appliance 120 and determine a display parameter for displaying the two-dimensional bar code according to the relative position, wherein the display parameter comprises a size of the two-dimensional bar code to be displayed and the two-dimensional bar code carries device information of the household appliance;

a transceiving module 402 configured to send the display parameter to the household appliance 120 to enable the household appliance 120 to display a two-dimensional bar code picture according to the display parameter;

the processing module 401 is further configured to recognize the two-dimensional bar code picture to obtain the device information of the household appliance 120.

In a possible embodiment, the transceiving module is further configured to receive a radio signal broadcasted by the household appliance 120 and determine a signal intensity of the radio signal; and the processing module 401 is configured to determine the relative position of the household appliance 120 and the terminal device 110 according to the signal intensity.

In a possible embodiment, the relative position include a distance between the household appliance 120 and the terminal device 110 and a relative angle between the household appliance 120 and the terminal device 110, and the display parameter further includes an angle between the two-dimensional bar code to be displayed on the household appliance 120 and the terminal device 110;

the processing module 401 is further configured to determine the angle between the two-dimensional bar code to be displayed on the household appliance 120 and the terminal device 110 according to the relative angle between the household appliance 120 and the terminal device 110;

the size of the two-dimensional bar code to be displayed is determined according to the distance between the household appliance 120 and the terminal device 110 and the first corresponding relationship, wherein the first corresponding relationship includes a corresponding relationship between different distances between the terminal device 110 and the household appliance 120 and the different sizes of the two-dimensional bar codes.

In a possible embodiment, the processing module 401 is configured to:

detect an operation for adjusting the displayed two-dimensional bar code when the device information of the household appliance is not obtained according to the two-dimensional bar code picture;

adjust the display parameter according operation to obtain the adjusted display parameter;

control the household appliance 120 to display the adjusted two-dimensional bar code picture according adjusted display parameter; and recognize the adjusted two-dimensional bar code picture to obtain the device information of the household appliance 120.

In a possible embodiment, the processing module 401 is also configured to:

adjust a focusing parameter of a camera in the terminal device 110 according to the relative position to enable the camera in the terminal device to be focused to the area of the two-dimensional bar code picture before recognizing the two-dimensional bar code picture to obtain the device information of the household appliance 120.

Figure 5:
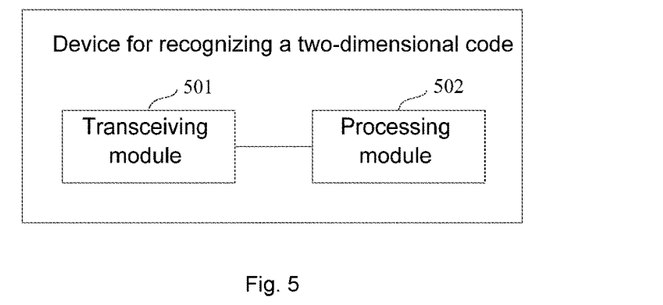
FIG. 5 is a second structural diagram of a device for recognizing the two-dimensional bar code provided by the embodiment of the disclosure.

Based on the method for recognizing the two-dimensional bar code described in FIG. 2, the embodiment of the disclosure provides a device for recognizing the two-dimensional bar code. The device is arranged in the household appliance 120 described in FIG. 2. Referring to FIG. 5, the device includes a processing module 501 and a transceiving module 502, wherein a transceiving module 501 is configured to receive a display parameter sent by a terminal device 110 during network configuration of the household appliance 120, wherein the display parameter is determined by the terminal device 110 according to the relative position of the terminal device 110 and the household appliance 120 and the display parameter includes a size of the two-dimensional bar code to be displayed; and a processing module 502 is configured to display the two-dimensional bar code picture according to the display parameter to enable the terminal device 110 to obtain the device information of the household appliance 120 according to the two-dimensional bar code picture.

In a possible embodiment, the transceiving module 501 is further configured to broadcast the radio signal.

Figure 6:
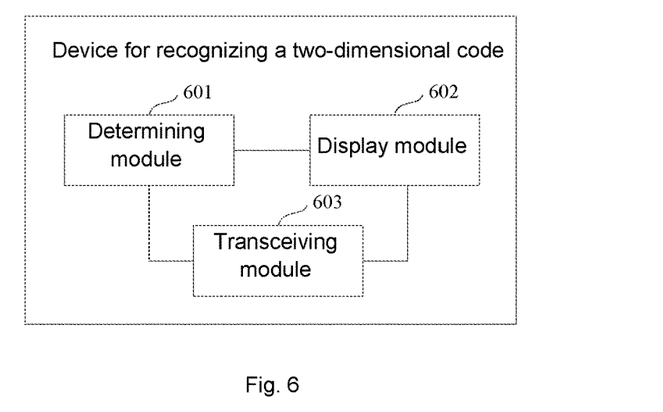
FIG. 6 is a third structural diagram of a device for recognizing the two-dimensional bar code provided by the embodiment of the disclosure.

Based on the method for recognizing the two-dimensional bar code described in FIG. 3, the embodiment of the disclosure provides a device for recognizing the two-dimensional bar code. The device is arranged in the household appliance 120 described in FIG. 3. Referring to FIG. 6, the device includes a determining module 601 and a display module 602, wherein the determining module 601 is configured to determine the relative position of the household appliance 120 and the terminal device 110 during network configuration of the household appliance 120 and determine the display parameter for displaying the two-dimensional bar code according to the relative position, the display parameter includes a size of the two-dimensional bar code to be displayed and the two-dimensional bar code carries device information of the household appliance; and the display module 602 is configured to display the two-dimensional bar code picture according to the display parameter to enable the terminal device 110 to obtain the device information of the household appliance 120 according to the two-dimensional bar code picture.

In a possible embodiment, the device further includes a transceiving 603 module, wherein the transceiving module 603 is configured to broadcast a radio signal and receive an intensity of the radio signal fed back by the terminal device 110; and the determining module 601 is configured to determine the relative position of the household appliance 120 and the terminal device 110 according to the intensity of the radio signal.

In a possible embodiment, the relative position include a distance between the household appliance 120 and the terminal device 110 and a relative angle between the household appliance 120 and the terminal device 110, and the display parameter further includes an angle between the two-dimensional bar code to be displayed on the household appliance 120 and the terminal device 110; the determining module is configured to:

determine the angle between the two-dimensional bar code to be displayed on the household appliance 120 and the terminal device 110 according to the relative angle between the household appliance 120 and the terminal device 110;

the size of the two-dimensional bar code to be displayed is determined according to the distance between the household appliance 120 and the terminal device 110 and the first corresponding relationship, wherein the first corresponding relationship includes corresponding relationships between different distances between the terminal device 110 and the household appliance 120 and the different sizes of the two-dimensional bar codes.

In a possible embodiment, the transceiving module 603 is further configured to receive the adjusted display parameter sent by the terminal device 110, wherein the adjusted display parameter is generated, by the terminal device 110, according to the operation for adjusting the displayed two-dimensional bar code when the two-dimensional bar code picture does not obtain the device information of the household appliance; and the display module 602 is further configured to display the adjusted two-dimensional bar code according adjusted display parameter.

Figure 7:
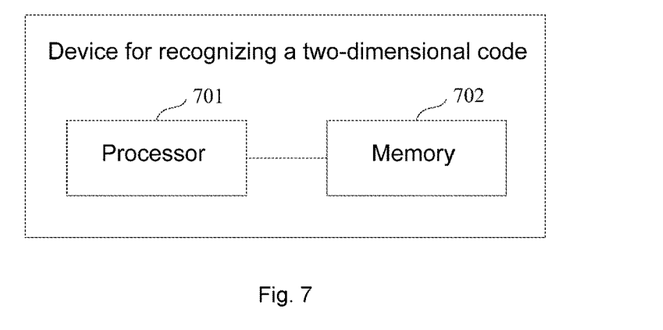
FIG. 7 is a fourth structural diagram of a device for recognizing the two-dimensional bar code provided by the embodiment of the disclosure.

Based on the method for recognizing a two-dimensional bar code described in FIG. 2 or FIG. 3, the embodiment of the disclosure further provides a device for recognizing a two-dimensional bar code. Referring to FIG. 7, the device includes:

at least one processor 701; and a memory 702 in communication connection with the at least one processor 701, wherein the memory 702 stores an instruction capable of being executed by the at least one processor 701, and the at least one processor realizes the method described in FIG. 2 or FIG. 3 by executing the instruction stored by the memory 702.

As an embodiment, the processing module 401 and the sending module 402 in FIG. 4 may be realized via the processor 701 in FIG. 7.

As an embodiment, the transceiving module 501 and the processing module 502 in FIG. 5 may be realized via the processor 701 in FIG. 7.

As an embodiment, the determining module 601, the display module 602 and the transceiving module 603 in FIG. 6 may be realized via the processor 701 in FIG. 7.

It should be noted that there may be one or more the processors 701 in FIG. 7. The processor 701 in FIG. 7 may be coupled with the memory 702.

Based on a method for recognizing a two-dimensional bar code described in FIG. 2 or FIG. 3, the embodiment of the disclosure further provides a computer readable storage medium, wherein the computer readable storage medium stores a computer instruction, and when the computer instruction runs on a computer, the computer executes the method shown in FIG. 2 or FIG. 3.

Those skilled in the art should understand that the embodiment of the disclosure may be provided as a method, a system or a computer program product. Therefore, the disclosure can adopt the forms of an entirely hardware embodiment, an entirely software embodiment or an embodiment combining hardware and software elements. Furthermore, the disclosure can adopt the form of a computer program product which can be executed by one or more computer usable storage mediums containing computer usable program codes therein (including but not limited to magnetic disk memory, CD-ROM, optical memory and the like).

The disclosure is described with reference to the flow diagrams and/or block diagrams of the method, equipment (system) and computer program product of the embodiments of the disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

While preferred embodiments of the present application have been described, those skilled in the art can make additional changes and modifications to the embodiments once knowing a basic creativity concept. Therefore, the appended claims are intended to be interpreted as including the preferred embodiments and all the changes and modifications falling within the scope of the present application.

It is apparent that those skilled in the art can make various modifications and variations to the present application without departing from the spirit and scope of the present application. Thus, if such modifications and variations of the present application fall within the scope of the appended claims and their equivalents, the present application is also intended to cover the modifications and variations.

What is claimed is:

1. A method for recognizing a two-dimensional bar code, applied to a terminal device, comprising:
    determining a relative position of the household appliance and the terminal device during network configuration of the household appliance;
    determining according to the relative position, a display parameter for displaying the two-dimensional bar code, wherein the display parameter comprises a size of the two-dimensional bar code to be displayed and the two-dimensional bar code carries device information of the household appliance;
    sending the display parameter to the household appliance to enable the household appliance to display a two-dimensional bar code picture according to the display parameter; and
    recognizing the two-dimensional bar code picture to obtain the device information of the household appliance.

2. The method as claimed in claim 1, wherein determining the relative position of the household appliance and the terminal device comprises:
    receiving a radio signal broadcasted by the household appliance and determining a signal intensity of the radio signal; and
    determining the relative position of the household appliance and the terminal device according to the signal intensity.

3. The method as claimed in claim 1, wherein the relative position comprise a distance between the household appliance and the terminal device and a relative angle between the household appliance and the terminal device, and the display parameter further comprises an angle between the two-dimensional bar code to be displayed on the household appliance and the terminal device; determining according to the relative position, the display parameter for displaying the two-dimensional bar code comprises:
    determining according to the relative angle between the household appliance and the terminal device, the angle between the terminal device and the two-dimensional bar code to be displayed on the household appliance; and
    determining according to the distance between the household appliance and the terminal device and a first corresponding relationship, the size of the two-dimensional bar code to be displayed, wherein the first corresponding relationship comprises corresponding relationships between different distances between the terminal device and the household appliance and the sizes of different two-dimensional bar codes.

4. The method as claimed in claim 1, wherein recognizing the two-dimensional bar code picture to obtain the device information of the household appliance comprises:
    detecting an operation for adjusting a displayed two-dimensional bar code when the device information of the household appliance is not obtained according to the two-dimensional bar code picture;
    adjusting the display parameter according to the operation to obtain a adjusted display parameter;
    controlling the household appliance to display a adjusted two-dimensional bar code picture according to the adjusted display parameter; and
    recognizing the adjusted two-dimensional bar code picture to obtain the device information of the household appliance.

5. The method as claimed in claim 1, wherein before recognizing the two-dimensional bar code picture to obtain the device information of the household appliance, the method comprises:
    adjusting a focusing parameter of a camera in the terminal device according to the relative position to enable the camera in the terminal device to be focused to an area of the two-dimensional bar code picture.

6. The method as claimed in claim 2, wherein the relative position comprise a distance between the household appliance and the terminal device and a relative angle between the household appliance and the terminal device, and the display parameter further comprises an angle between the two-dimensional bar code to be displayed on the household appliance and the terminal device; determining according to the relative position, the display parameter for displaying the two-dimensional bar code comprises:
    determining according to the relative angle between the household appliance and the terminal device, the angle between the terminal device and the two-dimensional bar code to be displayed on the household appliance; and
    determining according to the distance between the household appliance and the terminal device and a first corresponding relationship, the size of the two-dimensional bar code to be displayed, wherein the first corresponding relationship comprises corresponding relationships between different distances between the terminal device and the household appliance and the sizes of different two-dimensional bar codes.

7. Device for recognizing a two-dimensional bar code, comprising:
    at least one processor, and
    a memory in communication connection with the at least one processor,
    wherein the memory stores an instruction capable of being executed by the at least one processor, and the at least one processor realizes following actions by executing the instruction stored by the memory:
    determining a relative position of the household appliance and the terminal device during network configuration of the household appliance;
    determining according to the relative position, a display parameter for displaying the two-dimensional bar code, wherein the display parameter comprises a size of the two-dimensional bar code to be displayed and the two-dimensional bar code carries device information of the household appliance;

sending the display parameter to the household appliance to enable the household appliance to display a two-dimensional bar code picture according to the display parameter; and recognizing the two-dimensional bar code picture to obtain the device information of the household appliance.

8. The terminal device as claimed in claim 7, wherein determining the relative position of the household appliance and the terminal device comprises:

receiving a radio signal broadcasted by the household appliance and determining a signal intensity of the radio signal; and determining the relative position of the household appliance and the terminal device according to the signal intensity.

9. The terminal device as claimed in claim 7, wherein the relative position comprise a distance between the household appliance and the terminal device and a relative angle between the household appliance and the terminal device, and the display parameter further comprises an angle between the two-dimensional bar code to be displayed on the household appliance and the terminal device; determining according to the relative position, the display parameter for displaying the two-dimensional bar code comprises:

determining according to the relative angle between the household appliance and the terminal device, the angle between the terminal device and the two-dimensional bar code to be displayed on the household appliance; and determining according to the distance between the household appliance and the terminal device and a first corresponding relationship, the size of the two-dimensional bar code to be displayed, wherein the first corresponding relationship comprises corresponding relationships between different distances between the terminal device and the household appliance and the sizes of different two-dimensional bar codes.

10. The terminal device as claimed in claim 8, wherein the relative position comprise a distance between the household appliance and the terminal device and a relative angle between the household appliance and the terminal device, and the display parameter further comprises an angle between the two-dimensional bar code to be displayed on the household appliance and the terminal device; determining according to the relative position, the display parameter for displaying the two-dimensional bar code comprises:

determining according to the relative angle between the household appliance and the terminal device, the angle between the terminal device and the two-dimensional bar code to be displayed on the household appliance; and determining according to the distance between the household appliance and the terminal device and a first corresponding relationship, the size of the two-dimensional bar code to be displayed, wherein the first corresponding relationship comprises corresponding relationships between different distances between the terminal device and the household appliance and the sizes of different two-dimensional bar codes.

11. The terminal device as claimed in claim 7, wherein recognizing the two-dimensional bar code picture to obtain the device information of the household appliance comprises:

detecting an operation for adjusting a displayed two-dimensional bar code when the device information of the household appliance is not obtained according to the two-dimensional bar code picture;

adjusting the display parameter according to the operation to obtain a adjusted display parameter;

controlling the household appliance to display a adjusted two-dimensional bar code picture according to the adjusted display parameter; and recognizing the adjusted two-dimensional bar code picture to obtain the device information of the household appliance.

12. The terminal device as claimed in claim 7, wherein before recognizing the two-dimensional bar code picture to obtain the device information of the household appliance, the method comprises:

adjusting a focusing parameter of a camera in the terminal device according to the relative position to enable the camera in the terminal device to be focused to an area of the two-dimensional bar code picture.

\* \* \* \* \*